United States Patent [19]

McDaniel

[11] 4,397,765

[45] Aug. 9, 1983

[54] PHOSPHATED ALUMINA OR ALUMINUM PHOSPHATE CHROMIUM CATALYST

[75] Inventor: Max P. McDaniel, Bartlesville, Okla.

[73] Assignee: Phillips Petroleum Company, Bartlesville, Okla.

[21] Appl. No.: 375,156

[22] Filed: May 5, 1982

Related U.S. Application Data

[63] Continuation-in-part of Ser. No. 221,878, Dec. 31, 1980, abandoned.

[51] Int. Cl.$^3$ ............................. C08F 4/02; C08F 4/64
[52] U.S. Cl. .................................... 252/430; 526/134; 526/156
[58] Field of Search .......................................... 252/430

[56] References Cited

U.S. PATENT DOCUMENTS

| | | | |
|---|---|---|---|
| 2,441,297 | 5/1948 | Stirton | 260/668 |
| 2,840,551 | 6/1958 | Field et al. | 260/93.7 |
| 3,271,299 | 9/1966 | Kearby | 252/437 X |
| 3,342,750 | 9/1967 | Kearby | 252/437 |
| 3,453,219 | 7/1969 | O'Hara | 252/432 |
| 3,904,550 | 9/1975 | Pine | 252/437 |
| 3,947,433 | 3/1976 | Witt | 252/430 X |
| 4,080,311 | 3/1978 | Kehl | 252/437 |
| 4,219,444 | 8/1980 | Hill et al. | 252/435 |
| 4,364,839 | 12/1982 | McDaniel et al. | 252/430 |
| 4,364,840 | 12/1982 | McDaniel et al. | 252/430 |
| 4,364,841 | 12/1982 | McDaniel et al. | 252/430 |
| 4,364,842 | 12/1982 | McDaniel et al. | 252/430 |
| 4,364,854 | 12/1982 | McDaniel et al. | 252/437 |
| 4,364,855 | 12/1982 | McDaniel et al. | 252/437 |

FOREIGN PATENT DOCUMENTS

| | | |
|---|---|---|
| 1269892 | 7/1961 | France . |
| 808456 | 2/1959 | United Kingdom . |
| 1553779 | 10/1979 | United Kingdom . |
| 2017521A | 10/1979 | United Kingdom . |
| 1561756 | 2/1980 | United Kingdom . |

*Primary Examiner*—Patrick Garvin

[57] ABSTRACT

A catalyst system suitable for olefin polymerization comprising a catalyst component made up of chromium on a phosphated alumina or low phosphorus aluminum phosphate base and optionally an organometal cocatalyst. The resulting catalyst is particularly sensitive to the effects of hydrogen as a molecular weight control agent, thus allowing the production of polymers of having a melt flow varying over a wide spectrum utilizing the same catalyst.

33 Claims, No Drawings

PHOSPHATED ALUMINA OR ALUMINUM PHOSPHATE CHROMIUM CATALYST

CROSS REFERENCE TO RELATED APPLICATION

This is a continuation-in-part of copending application Ser. No. 221,878, filed Dec. 31, 1980 and now abandoned.

BACKGROUNDD OF THE INVENTION

This invention relates to chromium on alumina olefin polymerization catalysts.

Supported chromium oxide catalysts can be used to prepare olefin polymers in a hydrocarbon solution to give a product having excellent characteristics from many standpoints. Supported chromium oxide catalysts can also be used to prepare olefin polymers in a slurry system wherein the polymer is produced in the form of small particles of solid material suspended in a diluent. This process, frequently referred to as a particle-form process, has the advantage of being less complex. However, certain control operations which are easily carried out in the solution process are considerably more difficult in the particle-form process. For instance, in the solution process, control of the molecular weight can be effected by changing the temperature, with lower molecular weight (higher melt flow) being obtained at the higher temperature. However, in the slurry process, this technique is inherently limited since any efforts to increase the melt flow to any appreciable extent by increasing temperature would cause the polymer to go into solution and thus destroy the slurry or particle-form process. Also, it is frequently desired to have a polymer with a broader molecular weight distribution than is normally obtained in the slurry or particle-form process.

SUMMARY OF THE INVENTION

It is an object of this invention to provide a catalyst capable of giving both high melt flow and broad molecular weight distribution polymer;

It is a further object of this invention to provide a catalyst which inherently produces high molecular weight polymer and which is especially sensitive to molecular weight control agents so that a single catalyst can produce a complete spectrum of polymers so far as melt flow is concerned;

It is a further object of this invention to provide a catalyst suitable for use in slurry polymerization systems; and It is yet a further object of this invention to provide a catalyst capable of giving polymer suitable for blow molding, film and other applications requiring moderate to relatively high melt flow and at least fairly broad molecular weight distribution.

In accordance with this invention, an alumina-containing support or a low phosphorus aluminum phosphate support for a chromium-containing olefin polymerization catalyst is phosphated.

DESCRIPTION OF THE PREFERRED EMBODIMENTS

In the first embodiment of this invention, the support of the catalyst of this invention is a phosphated alumina-containing material. The alumina can be phosphated either by adding the phosphating agent to the alumina hydrogel or adding the phosphating agent to the alumina xerogel. In the second embodiment of this invention, an aluminum phosphate having a low phosphorus to aluminum ratio is treated in the same manner with the phosphating agent to impart additional phosphate to the surface. Generally the low phosphorus aluminum phosphate will have a phosphorus to aluminum atom ratio of 0.02:1 to 0.6:1, generally less than 0.4:1.

While low phosphorus aluminum phosphate can be conveniently thought of as a mixture of aluminum phosphate and alumina, it is in fact not a mixture but rather a gel having a network wherein trivalent $PO_4$ groups are replaced with trivalent $AlO_3$ groups. Obviously, at the very low ratios, it is predominantly alumina.

With either alumina or low phosphorus aluminum phosphate, it may be desirable to form the hydrogel in the presence of 1 to 30 mole percent of a boron compound such as boric acid, based on the moles of alumina or aluminum phosphate. The alumina can also contain minor amounts of other ingredients which do not adversely affect the quality of the final catalyst but is generally essentially pure alumina. Similarly, the low phosphorus aluminum phosphate can contain other ingredients which do not adversely affect the quality of the final catalyst, but is generally essentially low phosphorus aluminum phosphate.

It has been found from work with aluminum phosphate that the best polymer properties, such as high melt index, high density, good environmental stress crack resistance (ESCR) are obtained using a high P/Al ratio, i.e., about 0.8. However, surface area and pore volume are optimum at a lower P/Al ratio, i.e., about 0.4 because of sintering at the higher ratios. This invention makes it possible to have the good physical stability of a low P/Al ratio support since the bulk of the support is either pure alumina or low P/Al ratio aluminum phosphate and still have the good catalytic effect of the high ratio because of the high content of phosphorus on the surface.

In the case of phosphating a hydrogel, it is preferred that after phosphating, the water be removed to convert the hydrogel to a xerogel by means of azeotropic distillation or washing with a water miscible liquid. Any water miscible liquid effective in aiding in removing water can be utilized. Generally, such liquids are relatively volatile, oxygen-containing organic compounds having relatively low surface tension. Exemplary classes of such compounds are alcohols, ketones, and esters. Particularly suitable are alcohols, such as isoamyl alcohol, and esters, such as ethyl acetate. Where xerogel is phosphated, it is preferred that it be converted to the xerogel from the hydrogel in the same manner particularly if it is a low phosphorus aluminum phosphate.

Whether the starting material is alumina or a low phosphorus aluminum phosphate, the invention takes advantage of the fact that some properties, such as surface area, are favored by high alumina content whereas others, such as melt index potential, are favored by high phosphate content. By imparting a phosphate layer on the surface of alumina or low phosphorus aluminum phosphate, it is possible to take advantage of both trends.

The alumina can be made as is well known in the art, for instance by reacting sodium aluminate, which is basic, with aluminum sulfate, which is acidic, by neutralizing an aluminum salt with a base such as ammonia or ammonium hydroxide, or by flame hydrolysis.

The low phosphorus aluminum phosphate can also be made by methods well known in the art as disclosed in Hill et al, U.S. Pat. No. 4,219,444, the disclosure of which is hereby incorporated by reference whereby an aluminum salt is combined with a source of phosphate ions (insufficient to give a high phosphorus ratio) and neutralized with a base, or by combining an aluminum alkoxide with phosphoric acid (insufficient to give a high phosphorus ratio) which gives a xerogel directly, as disclosed in Pine, U.S. Pat. No. 3,904,550, the disclosure of which is hereby incorporated by reference.

Preferably, the low phosphorus aluminum phosphate is made by utilizing an aluminum salt which will melt, with the source of the phosphate ions being combined with the melt and then neutralized to give the hydrogel. Generally those salts with a sufficiently low melting point are hydrated. Orthophosphoric acid and monoammonium dihydrogen phosphate are preferred sources of phosphate ions. $Al(NO_3)_3 \cdot 9H_2O$ is a particularly preferred aluminum salt. In a variation of this, a very concentrated syrup of a soluble aluminum salt in 20 weight percent or less added water can be used in place of the melt. Thus broadly, the aluminum salt and source of orthophosphate ions are combined in a concentrated mass and neutralized. The neutralization can occur by using enough base to force formation of the gel in which case the gel should occur of a high pH generally above 5, preferably 6 to 7 or above (by quickly adding the last one-third of the neutralizing agent, for instance). Alternatively, only 60 to 70 percent of the base needed to neutralize can be used and the concentrated mass allowed to stand until gellation occurs spontaneously at low pH after about 1 minute to 48 hours.

The phosphating agent can be any source of phosphate ions, preferably orthophosphoric acid. Alternatively, an orthophosphate such as monoammonium dihydrogen phosphate or diammonium hydrogen phosphate or even a metal phosphate can be used. Alternatively, a phosphorus compound which can be vaporized such as $POCl_3$ (phosphoryl chloride) or $PCl_3$ (phosphorus trichloride) can be used, when treating a xerogel. However when an alumina xerogel is phosphated, the treatment is preferably carried out by forming a slurry of the support and the source of phosphate ions such as orthophosphoric acid in a diluent such as water. Also included are compounds which are converted to phosphates during calcining. For instance alumina or low phosphorus aluminum phosphate can be treated with phosphite ions such as phosphorus acid or $NH_4H_2PO_3$ and thereafter the thus treated support is calcined. Also suitable are phosphorus containing organic compounds such as phosphine derivatives.

The phosphating agent may be incorporated in an organic water miscible liquid used to treat either a hydrogel or a xerogel. If the starting material is a hydrogel, then the organnic liquid/phosphating agent composition effects both the conversion of the hydrogel to a xerogel and the phosphating. More specifically if a hydrogel is used, the hydrogel may be washed with water, then with an organic liquid such as isoamyl alcohol containing the phosphating agent such as phosphoric acid, then filtered and the solvent allowed to evaporate.

The phosphating agent is preferably used in an amount to react with the alumina or low phosphorus aluminum phosphate surface to give a P/Al atom ratio of the reaction product on the surface of 0.2:1 to 2:1, preferably 0.6:1 to 0.9:1. In practice, however, it is possible to use as much phosphating agent as desired with the excess simply being washed off after the phosphating treatment is complete. The phosphating treatment is generally carried out at a temperature of 15° C. to 500° C., preferably room temperature to the boiling point of the solvent if a phosphate solution is used or about 200° C. if a vapor is used and a time of 1 minute to 2 hours, preferably 2 minutes to 30 minutes.

The phosphorus component is added in an amount to give 0.1 to 20, preferably 1 to 10 mole percent of the phosphorus compound incorporated based on the total moles of alumina or low phosphorus aluminum phosphate. Most preferably about 1 to 5 atom percent is incorporated which would be about 1 to 5 atoms of phosphorus per atom of chromium particularly when the preferred 1 weight percent chromium based on the weight of the silica-containing support is used. Generally, the ratio of atoms of phosphorus per atom of chromium will be in the range of 0.1 to 20, preferably 1 to 10. Based on surface area, the phosphorus compound from the phosphating agent is preferably present in an amount sufficient to give about 0.005 to 1, preferably about 0.01 to 0.5 mg $P/m^2$ of alumina or low phosphorus aluminum phosphate surface as measured by BET nitrogen sorption.

The chromium compound can be any compound in or convertible to the hexavalent state and can be introduced anytime prior to activation. The catalyst contains chromium in an amount generally within the range of about 0.001 to 10, preferably 0.1 to 5, more preferably about 1 weight percent based on the weight of the dried phosphated support. The chromium compound can be incorporated as known in the art. For instance, a hydrocarbon solution of a material such as tertiary butyl chromate can be used to impregnate the xerogel or an aqueous solution of a chromium compound such as $CrO_3$ (chromium trioxide), chromium acetate or chromium nitrate can be added to the hydrogel before drying, or chromium can be coprecipitated along with the alumina or low phosphorus aluminum phosphate. In general, it is preferred to phosphate the alumina before adding the chromium component. Most preferably, the phosphated base is heated prior to addition of the chromium. Thus, in this preferred embodiment, the base is heated twice, once after the phosphorus is added, then the chromium is added and it is heated again to activate the catalyst for polymerization.

The activation of the chromium-containing catalyst can be carried out at a lower temperature than is generally required for activating silica based chromium catalysts. Temperatures of 150°-800° C., preferably 300°-800° C., more preferably 300°-600° C. are suitable. The activating ambient can be any oxidizing ambient but for reasons of convenience is generally air. Times of 1 minute to 48 hours, preferably 0.5 to 10 hours are suitable. Similar times and temperatures can be used for heating the phosphated base if such is done prior to adding chromium. In this prior heating step, the ambient can be either the same as in the subsequent activation or it can be an inert ambient such as nitrogen or a reducing ambient such as carbon monoxide. If the phosphating agent contains halide such as $POCl_3$, a steam treatment before activation may be helpful to remove halide.

The catalysts of this invention can be used in conjunction with a cocatalyst if desired. Suitable cocatalysts include aluminum and boron alkyls. The most preferred boron compounds are trihydrocarbyl boron compounds, particularly tri-n-butylborane, tripropylborane, and triethylborane (TEB). Other suitable boron compounds include trialkyl boron compounds broadly, particularly those having alkyl groups of 1 to 12 carbon atoms, preferably 2 to 5 carbon atoms, triaryl boron compounds such as triphenylborane, boron alkoxides such as $B(C_2H_5)_2OC_2H_5$ and halogenated alkyl boron compounds such as $BC_2H_5Cl_2$. Suitable aluminum alkyls include $R_3Al$, $R_2AlX$ and $RAlX_2$ compounds where R is a 1 to 12 carbon atom hydrocarbyl radical and X is a halogen, preferably chlorine. Triethylaluminum and diethylaluminum chloride are particularly suitable.

The cocatalyst is used in an amount within the range of about 0.5 to 25, preferably 2 to 10 parts per million based on the solvent or diluent in systems employing a solvent or diluent and based on total reactor contents in systems not employing a solvent or diluent. Based on the chromium in the catalyst, they are used in an amount so as to give from 0.1 to 3, preferably 0.3 to 2 times as much boron by weight as chromium by weight. Based on atoms of boron per atom of chromium, the amount of cocatalyst used will give about 0.5 to about 14, preferably about 1.5 to about 10 atoms of boron per atom of chromium. The boron cocatalysts give higher density polymer than aluminum cocatalysts or catalyst system with no cocatalyst.

The cocatalyst can be either premixed with the catalyst or introduced into the reactor as a separate stream, the latter being the preferred procedure.

Of course, the final catalyst can be used with, or contain, other ingredients which do not adversely affect its performance, as for example other cocatalysts, antistatic aids in the polymerization zone and other conventional ingredients.

The catalyst of this invention can be used to polymerize at least one mono-1-olefin containing 2 to 8 carbon atoms per molecule, preferably ethylene, propylene, 1-butene, 1-pentene, 1-hexene and 1-octene. The invention is of particular applicability in producing ethylene homopolymers and copolymers from mixtures of ethylene and 0.5 to 20 mole percent one or more comonomers selected from 1-olefins containing 3 to 8 carbon atoms per molecule. Exemplary comonomers include aliphatic 1-olefins, such as propylene, 1-butene, 1-pentene, 1-hexene, 1-octene and other higher olefins and conjugated or non-conjugated diolefins such as 1,3-butadiene, isoprene, piperylene, 2,3-dimethyl-1,3-butadiene, 1,4-pentadiene, 1,7-hexadiene, and other such diolefins and mixtures thereof. Ethylene copolymers preferably constitute at least about 90, preferably 97 to 99.6 weight percent polymerized ethylene units. Propylene, 1-butene, 1-pentene, 1-hexene and 1-octene are especially preferred comonomers for use with ethylene. Alternatively, 0.001 to 0.3 mole percent of the same comonomer can be used with ethylene to give an essentially ethylene homopolymer having a higher melt flow.

The polymers can be prepared from the catalyst of this invention by solution polymerization, slurry polymerization, and gas phase polymerization techniques using conventional equipment and contacting processes. Contacting of the monomer or monomers with the catalyst can be effected by any manner known in the art of solid catalysts. One convenient method is to suspend the catalyst in the organic medium and to agitate the mixture to maintain the catalyst in suspension throughout the polymerization process. Other known contacting methods such as fluidized bed, gravitating bed, and fixed bed can also be employed. The catalyst of this invention can be used to produce ethylene polymers in a particle form process as disclosed in U.S. Pat. No. 3,624,063 which issued Nov. 30, 1971 to Witt, the disclosure of which is hereby incorporated by reference.

The catalyst of this invention is particularly suitable for use in slurry polymerizations. The slurry process is generally carried out in an inert diluent (medium) such as a paraffin, cycloparaffin or aromatic hydrocarbon. For predominantly ethylene polymers, a temperature of about 66°–110° C. is employed. Pressures in the particle form process can vary from about 110 to about 700 psia (0.76–4.8 MPa) or higher. The catalyst is kept in suspension and is contacted with the monomer or monomers at sufficient pressure to maintain the medium and at least a portion of the monomer or monomers in the liquid phase. The medium and temperature are thus selected such that the polymer is produced as solid particles and is recovered in that form. Generally in slurry polymerization of ethylene homopolymer and predominantly ethylene copolymer systems, the feasible temperature range is 200°–230° F. (93°–110° C.), and the commercial systems are run as close to the maximum as possible, i.e., 225° F.±5° F. (107° C.±3° C.) in order to obtain the highest possible melt index without the polymer going into solution. The catalyst of this invention allows running at the low end of this range, i.e., 205° F.±5° F. (96° C.±3° C.) in systems normally employing 225° F. (107° C.). The lower temperature gives a relatively higher monomer partial pressure, thus giving higher activity.

Catalyst concentrations can be such that the catalyst content ranges from 0.001 to about 1 weight percent based on the weight of the reactor contents.

When hydrogen is used in the prior art, it is generally used at pressures up to 120 psia (0.8 MPa), preferably within the range of 20 to 70 psia (0.01 to 0.48 MPa). Similar amounts can be used in accordance with this invention although smaller amounts are sometimes preferred because of the sensitivity of this catalyst system to the effects of hydrogen.

The presence of comonomer has a tendency to increase melt flow more than would be expected. Hence the use of only a small amount of comonomer, say 0.001 to 0.3, preferably 0.01 to 0.1 mole percent in the feed can be used to give a polymer which is essentially a homopolymer but which has increased melt flow.

Each run in all of the following examples was conducted in a clean, dry, air-free, stirred, stainless steel reactor of about a 2 L capacity. About 600 g of isobutane was used in each run as diluent with a catalyst charge ranging from about 0.03 to about 0.8 g. The reactor and its contents were heated to the desired operating temperature, ethylene was pressured in to give about 565 psia (3.9 MPa), and the run was started immediately as the catalysts, unlike the corresponding chromium oxide-silica catalysts, do not have an induction period. Ethylene pressure was maintained during the run by supplying additional ethylene as required from a reservoir.

Each run was terminated by stopping the ethylene flow and venting the gaseous reactor contents to a flare line for disposal. The polymer was recovered, dried and weighed to determine catalyst productivity which is expressed in terms of grans polyethylene per gram catalyst. TEB stands for triethylborane.

EXAMPLE I

In this example, a phosphated alumina catalyst was prepared as follows. One hundred grams of Al(NO$_3$)$_3$.9-H$_2$O was combined with 500 mL water. To this was added 60 mL concentrated ammonium hydroxide to give a pH of 8 where hydrated alumina precipitate formed. Then 15 mL of H$_3$PO$_4$ in 100 mL water was added as the phosphating agent. The pH was then below 4. Thereafter 5 mL concentrated ammonium hydroxide was added to return the pH to neutrality. The precipitate was filtered, azeotrope dried with isoamyl alcohol and impregnated with sufficient chromium acetate in methanol to give 1 weight percent chromium based on the weight of the final activated alumina. This is run 2 in the following table.

The control run 1 was made in an essentially identical manner except no phosphoric acid was used. The results were as follows:

| Run No. | Catalyst | Productivity[1] | Run Time, min. | MI[2] | HLMI[3] | HLMI/MI | Cocatalyst |
|---|---|---|---|---|---|---|---|
| 1 | Al$_2$O$_3$[4] | 1340 | 60 | 0 | 0 | — | 8 ppm TEB |
| 2 | Al$_2$O$_3$/PO$_4$[5] | 2425 | 60 | 0.81 | 172 | 213 | 8 ppm TEB |

[1] Grams of polymer per gram of catalyst for the entire run time which was 60 minutes.
[2] Melt index as determined by ASTM D1238-65T, Condition E.
[3] High load melt index ASTM D1238-65T, Condition F.
[4] Activated in air at 700° C.
[5] Activated in air at 500° C.

The control was activated at 700° C. compared with 500° C. for the invention run. Had the control been activated at 500° C. in the same manner as the invention run, it would have not produced as good of results as it did. Indeed, it would have barely been operable. This further demonstrates the advantage of the invention. That is a remarkable improvement in both productivity and melt index was obtained even though a less favorable activation temperature was used.

EXAMPLE IA

This example, like Example I demonstrates phosphating the hydrogel in an aqueous medium. In this example, 79.8 grams of aluminum sulfate, Al$_2$(SO$_4$)$_3$.16H$_2$O was combined with 2.38 g chromic nitrate, Cr(NO$_3$)$_3$.9H$_2$O in water to give a final volume of 125 mL. This solution was dripped into an excess of concentrated ammonium hydroxide containing some ammonium carbonate. Afterward the ammonium hydroxide was drained off and the gel was rinsed in water several times. Finally, it was washed in about 1 liter of warm water to which was added 13.8 mL of phosphoric acid. The gel was filtered, washed twice in isopropyl alcohol, dried and activated at 600° C. in air for 5 hours. In an ethylene polymerization run with 4 ppm TEB cocatalyst, a productivity of 3510 g/g was obtained in 44 minutes. The MI was not run.

EXAMPLE II

In this example, 8 g of flame treated alumina (sold under the tradename DeGussa) was slurried in 200 mL isopropyl alcohol and 6 mL orthophosphoric acid was added. The slurry was warmed to about 40° C. and held 15 minutes. It was then washed in isopropyl alcohol, dried and calcined in air at 500° C. for 3 hours. Dicumene chromium was added in an amount sufficient to provide 1 weight percent chromium based on the dry catalyst and it was calcined again at 500° C. in air to convert at least a portion of the chromium to the hexavalent state. Productivity was 2060 in 60 minutes with 8 ppm TEB. Melt index was 0.02 and the HLMI/MI ratio was 672.

This example shows that the phosphate treatment can be carried out on a xerogel.

EXAMPLE III

Two runs were made using a low phosphorus gel. The procedure used to make the low phosphorus gel was as follows. Hydrated aluminum nitrate (¼ mole) was heated to melt and combined with 7.2 grams of ammonium dihydrogen phosphate. A very small amount of water was added to give 100 mL and it was then neutralized with 54 mL concentrated ammonium hydroxide to form the gel. The gel was washed with 4 liters of warm water. The gel was then divided into two parts, each having a phosphorus to aluminum ratio of 0.2. The first part (control) was washed with 4 liters of isopropanol, dried, and impregnated with tertiary butyl chromate in an amount sufficient to give 1 weight percent chromium based on the weight of the dry gel and calcined at 700° C. It was run with 8 ppm TEB and gave 3270 g/g productivity in 60 minutes. The melt index was 0.0 and the HLMI was 0.77.

In the second (invention) run, the same hydrogel was used except in the last step the washing with isopropyl alcohol was done using alcohol containing enough phosphoric acid to convert the phosphorus to aluminum ratio to 0.8 (10 mL) overall, i.e. not just on the surface. But the recovered phosphoric acid in alcohol solution remained acidic indicating that not all of it reacted and therefore only the surface was upgraded. It was dried, impregnated with tertiary butyl chromate and calcined as before and used with 8 ppm TEB. The productivity was 3505 g/g in 35 minutes (just over half the time for the control), the HLMI was 136, the melt index was 0.92, and the HLMI/MI ratio wwas 148.

This example shows that a low phosphorus aluminum phosphate can be phosphated as well as alumina. The HLMI increased from 0.77 to 136, i.e., over a 17,000 percent increase, and activity was also greatly improved.

While this invention has been described in detail for the purpose of illustration, it is not to be construed as limited thereby but is intended to cover all changes and modifications within the spirit and scope thereof.

I claim:
1. A method of making a catalyst system comprising
   (a) treating a separately prepared alumina gel with a phosphating agent to give a surface treatment and activating the thus treated gel in an oxidizing atmosphere at an elevated temperature, said gel either having a chromium compound coprecipitated therewith or having a chromium compound added thereto prior to said activating; and

(b) combining an organometal cocatalyst with the thus activated catalyst.

2. A method according to claim 1 wherein said phosphating agent is phosphoric acid and is incorporated in an amount within the range of 1 to 10 mole percent based on the total moles of said alumina.

3. A method according to claim 1 wherein said cocatalyst is tri-n-butylborane.

4. A method according to claim 1 wherein said chromium compound is present in an amount within the range of 0.1 to 5 weight percent chromium based on the weight of said gel after activation.

5. A method according to claim 1 wherein said activating is carried out in air for 1 minute to 48 hours at 150°–800° C.

6. A method according to claim 1 wherein said alumina gel consists essentially of alumina.

7. A method according to claim 1 wherein said cocatalyst is triethylborane.

8. A method according to claim 1 wherein said phosphating agent is orthophosphoric acid and said phosphoric acid is used in an amount to give 0.01 to 0.5 milligrams phosphorus per square meter of surface area of the alumina after said alumina has been converted from a hydrogel to a zerogel and said cocatalyst is one of triethylborane, tripropylborane and tri-n-butylborane.

9. A method according to claim 1 wherein said alumina gel is treated with said phosphating agent while in the xerogel state, thereafter said chromium compound is added and the chromium-containing xerogel activated in air for a time within the range of 1 minute to 48 hours at a temperature of 150°–800° C.

10. A method according to claim 1 wherein said alumina gel is treated with said phosphating agent while in a hydrogel state, said chromium compound is added to the resulting treated hydrogel and the hydrogel converted to a xerogel by azeotrope drying or washing with a water miscible organic liquid prior to said activating, and wherein said activating is carried out in air for a time within the range of 1 minute to 48 hours at a temperature of 150°–800° C.

11. A method according to claim 10 wherein said phosphating agent is orthophosphoric acid.

12. A method according to claim 11 wherein said treating is carried out using said phosphoric acid in an amount to give 0.01 to 0.5 milligrams phosphorus per square meter of surface area of said alumina xerogel and said chromium is present in an amount within the range of 0.1 to 5 weight percent based on the weight of said xerogel.

13. A method according to claim 12 wherein said cocatalyst is one of triethylborane, tripropylborane, or tri-n-butylborane.

14. A catalyst produced by the method of claim 13.

15. A catalyst produced by the method of claim 1.

16. A catalyst system comprising
(a) a catalyst comprising a chromium oxide on a surface phosphated alumina gel base; and
(b) an organometal cocatalyst.

17. A method of preparing a catalyst comprising treating a separately prepared low phosphorus aluminum phosphate gel with a phosphating agent to give a surface treatment and activating the thus treated gel in an oxidizing atmosphere at an elevated temperature, said gel either having a chromium compound coprecipitated therewith or having a chromium compound added thereto prior to said activating.

18. A method according to claim 17 wherein in addition an organometal cocatalyst is combined with said thus activated catalyst.

19. A method according to claim 17 wherein said low phosphorus aluminum phosphate has a phosphorus to aluminum atom ratio within the range of 0.02:1 to 0.6:1.

20. A method according to claim 19 wherein said phosphating agent is one of orthophosphoric acid or monoammonium dihydrogen phosphate, and said phosphating agent is added to said low phosphorus aluminum phosphate in the hydrogel state after which the hydrogel is converted to a xerogel by means of azeotropic distillation or washing with a water miscible organic compound, dried of organic compound and then subjected to said activating.

21. A method according to claim 20 wherein said activating is carried out in air at a temperature within the range of 150°–800° C. for a time within the range of 0.5 to 10 hours.

22. A method according to claim 20 wherein said chromium is introduced at the hydrogel state by means of adding a water soluble chromium compound.

23. A method according to claim 22 wherein said water soluble chromium compound is one of $CrO_3$, chromium acetate, or chromium nitrate.

24. A catalyst produced by the method of claim 23.

25. A catalyst produced by the method of claim 17.

26. A method of making a catalyst comprising
(a) treating an alumina hydrogel with orthophosphoric acid, adding a chromium compound to the resulting treated hydrogel, converting the hydrogel to a xerogel by azeotrope drying or washing with a water miscible organic liquid, and activating the thus treated xerogel in air for a time within the range of 1 minute to 48 hours at a temperature of 150°–800° C., wherein said phosphoric acid is used in an amount to give 0.01 to 0.5 milligrams phosphorus per square meter of surface area of said alumina zerogel and said chromium compound is added in an amount sufficient to provide chromium in an amount within the range of 0.1 to 5 weight percent based on the weight of said xerogel; and
(b) combining an organometal cocatalyst with the thus activated catalyst.

27. A method according to claim 26 wherein said cocatalyst is one of triethylborane, tripropylborane or tri-n-butylborane.

28. A catalyst produced by the method of claim 27.

29. A catalyst produced by the method of claim 26.

30. A method of making a catalyst system comprising
(a) treating an alumina xerogel with phosphoric acid in an amount sufficient to give 0.01 to 0.5 milligrams phosphorus per square meter of surface area of said alumina xerogel, adding a chromium compound in an amount sufficient to give chromium in an amount within the range of 0.1 to 5 weight percent based on the weight of said xerogel, activating said xerogel containing said chromium by heating in air for a time within the range of 1 minute to 48 hours at a temperature of 150°–800° C.; and
(b) combining an organometal cocatalyst with the thus activated catalyst.

31. A method according to claim 26 wherein said cocatalyst is one of triethylborane, tripropylborane, or tri-n-butylborane.

32. A catalyst produced by the method of claim 31.

33. A catalyst produced by the method of claim 30.